June 27, 1950 H. W. G. SALINGER ET AL 2,512,682

DUPLEX ANTENNA

Filed May 31, 1946 3 Sheets-Sheet 1

INVENTORS
HANS W. G. SALINGER
VIRGIL R. BOWMAN

BY [signature]

ATTORNEY

DUPLEX ANTENNA

Filed May 31, 1946 3 Sheets-Sheet 2

INVENTORS
HANS W. G. SALINGER
VIRGIL R. BOWMAN
BY [signature]
ATTORNEY

June 27, 1950 H. W. G. SALINGER ET AL 2,512,682

DUPLEX ANTENNA

Filed May 31, 1946 3 Sheets-Sheet 3

INVENTORS
HANS W. G. SALINGER
VIRGIL R. BOWMAN

BY [signature]

ATTORNEY

Patented June 27, 1950

2,512,682

UNITED STATES PATENT OFFICE 2,512,682

DUPLEX ANTENNA

Hans W. G. Salinger and Virgil R. Bowman, Fort Wayne, Ind., assignors, by mesne assignments, to Farnsworth Research Corporation, a corporation of Indiana Application May 31, 1946, Serial No. 673,275

7 Claims. (Cl. 250—33.51)

This invention relates generally to antennas and more particularly to a rotatable antenna which is responsive to signals in two widely separated frequency bands.

Television frequency allocations, for example, have been made wherein the television services are disposed adjacent to the 60 megacycle and the 200 megacycle bands. The wide separation of these frequency bands offers but a slight possibility that a single antenna will render equally satisfactory signal reception in both bands. Therefore, a television receiver adapted to receive signals on both the 60 and 200 megacycle bands would normally require two separate antennas, each having a separate feeder system for transferring the signal energy from the antennas to the tuning elements within the receiver.

It is further recognized that the reception of signals at the higher radio frequencies is greatly affected by the pronounced directional properties of certain types of receiving antenna. Thus, the installation of a fixed or immovable dipole type antenna usually requires that the antenna elements be arbitrarily positioned so as to render an average response to signal energy arriving from several different directions. It will be evident that some of these signals will be attenuated more than others due to inherent discrimination resulting from the directional properties of the dipole.

It is also evident that the propagation of television signals in a large metropolitan area is often accompanied by reflective phenomena which tend to create ghost patterns in the reproduced television image. The amplitude of these ghost patterns may be reduced by the trial and error process of orienting the fixed antenna so as to discriminate against the reflected signals, but it is often found that the over-all response to other transmitted signals suffers by this compromise adjustment.

Thus, it is generally understood that it is relatively difficult to obtain satisfactory television reception from a plurality of transmitting stations when a fixed receiving antenna is employed. The major difficulty arises from a combination of factors comprising the directional sensitivity of the antenna, the presence of multipath reflections and the dissimilar directions from which the transmitted signals are received.

It is an object of the present invention, therefore, to provide an improved antenna arrangement adapted for use on two widely separated high frequency bands.

It is another object of the invention to provide a remotely controlled rotary antenna which may be oriented for optimum signal reception within two separate frequency bands.

A further object of the invention is to provide a directional antenna apparatus comprising a pair of directional antennas each of which are responsive to widely separated frequencies and wherein rotary switching means are provided for connecting either of said antennas to a single transmission line.

A still further object of the invention is to provide a remotely controlled rotatable antenna array having a plurality of dipoles and switching means whereby a predetermined dipole may be connected to a receiver feeder circuit over a predetermined angle of the rotative cycle.

Another object of the invention is to provide an electrical switching device adapted to connect one of several rotatable antennas to a receiver and to maintain that connection through a predetermined angle of rotation.

In accordance with this invention, there is provided an antenna structure for receiving radiant energy in two separate wave bands comprising a pair of directional antennas displaced 90 degrees with respect to one another. One antenna may be tuned to a relatively low frequency band while the other antenna may be tuned to a relatively high frequency band. Means are provided for rotatably supporting the antennas in displaced relation to one another and there is also provided rotatable switch means operably associated with the supporting means and comprising first and second pairs of contacts connected to each of the directional antennas. Cooperating with the pairs of contacts, there is provided a stationary contact means for establishing a circuit to one antenna during the first 180 degrees of rotation thereof and to the other antenna during the second 180 degrees of rotation thereof.

For a better understanding of the invention, together with other and further objects thereof, reference is made to the following description, taken in connection with the accompanying drawings, and its scope will be pointed out in the appended claims.

Figure 1:
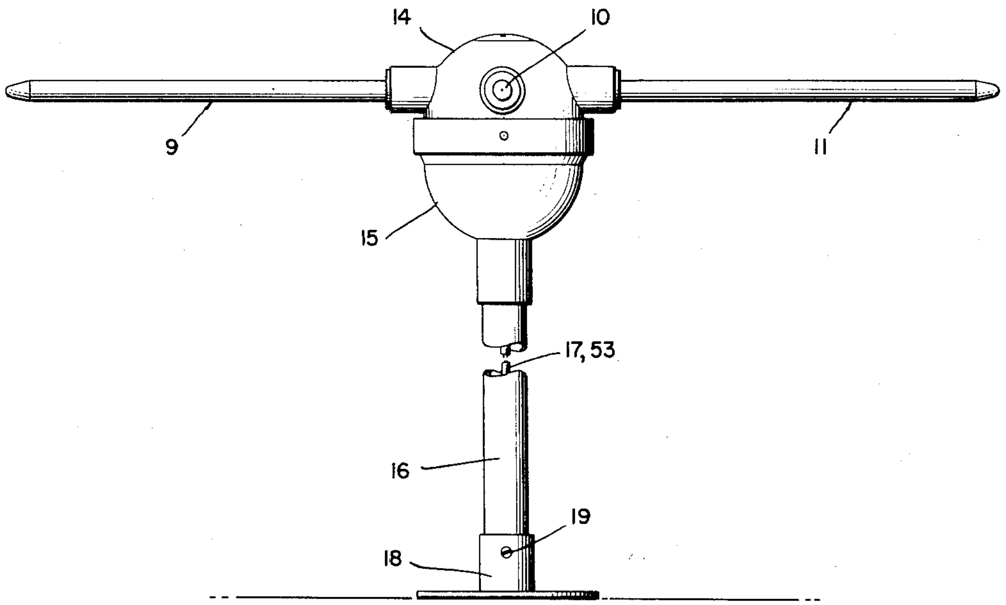
Fig. 1 is a side view of a duplex dipole antenna embodying the present invention.
Figure 2:
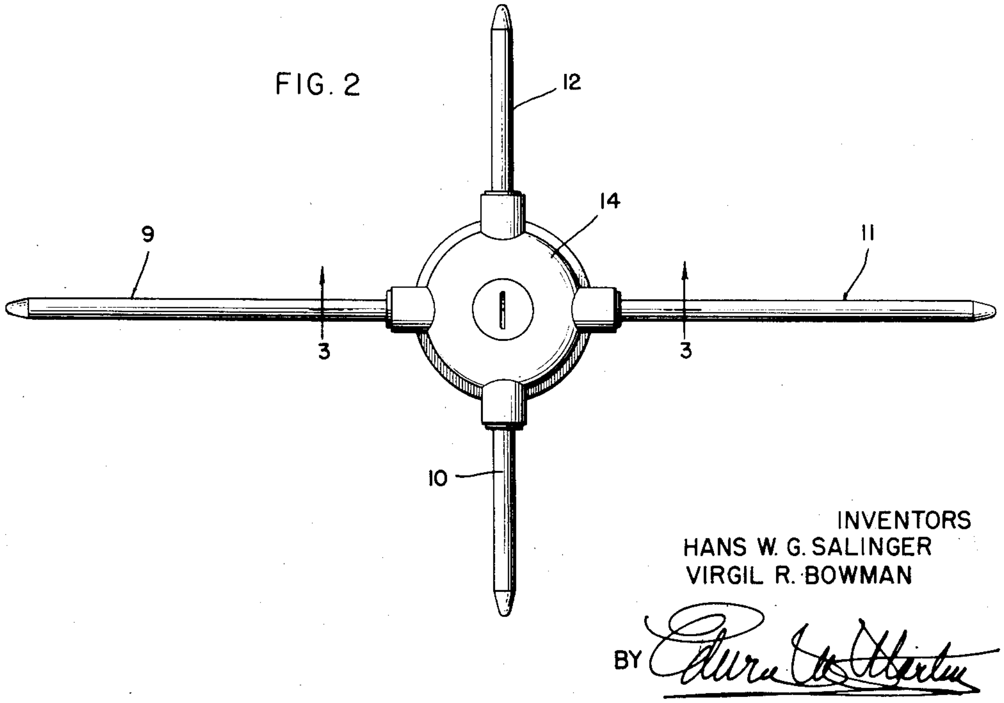
Fig. 2 is a top view of the antenna structure.

Referring particularly to Figs. 1 and 2, there is illustrated a side and top view respectively of the rotatable duplex dipole antenna and supporting structure embodied in the present invention. The dipole elements 9, 10, 11 and 12 are horizontally supported by the upper housing 14 which is rotatably arranged on a lower housing 15. Dipole elements are shown by way of example only as it will be obvious that other forms of directional antennas fall within the scope of this invention. The upper housing 14 and the lower housing 15 serve to support and enclose the antenna rotating apparatus and the antenna switching mechanism, hereinafter described and illustrated in Fig. 3. Lower housing 15 is stationary and is rigidly affixed to the topmost section of the vertical tubular mast 16. The tubular mast 16 serves to support and maintain the antenna structure at the desired height, and at the same time the mast serves as a protective conduit for wiring 17 which may be connected between the antenna elements or rotary apparatus and a remotely located receiving and control point. The lower end of tubular mast 16 is seated in base plate 18 and held therein by means of set screw 19, thereby providing means for suitably mounting the structure upon the surface of a roof, or the like.

Figure 3:
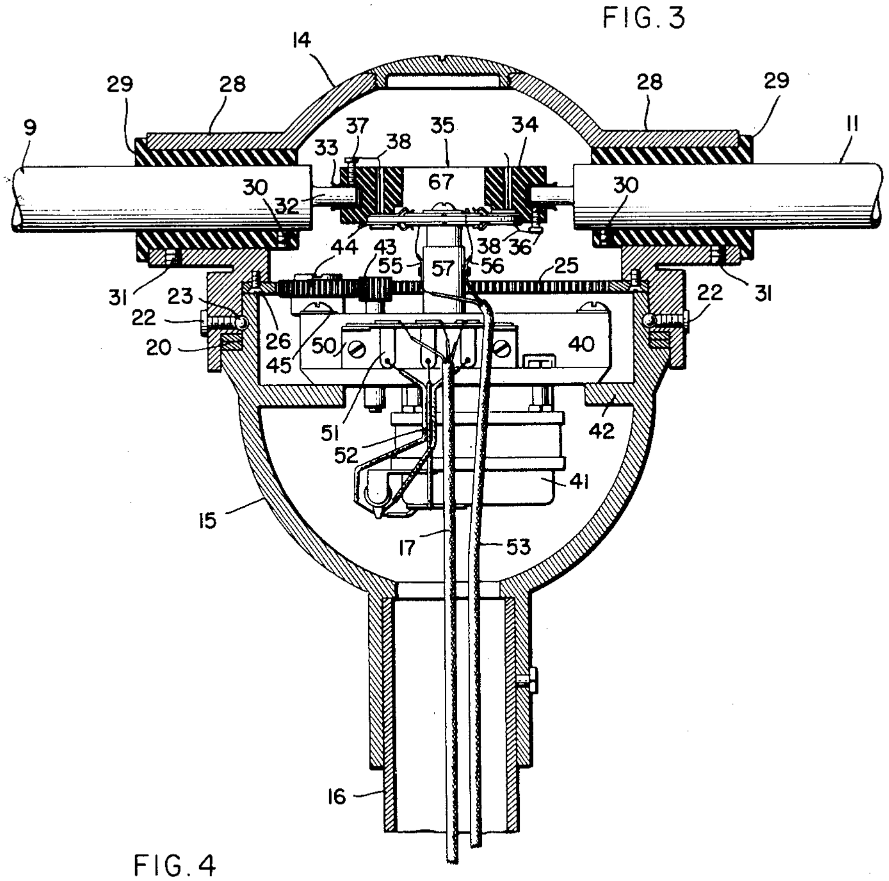
Fig. 3 is a sectional view of the upper and lower housing (taken on lines 3—3 of Fig. 2) showing the antenna rotating apparatus and antenna switching mechanism.

Fig. 3 is a sectional view of the dipole and housing structure taken on the lines 3—3 of Fig. 2 illustrating a reversible electric motor and driving gears which are provided for rotating the upper housing and therewith the dipole elements. There is also provided an antenna switching arrangement actuated by the rotary movement of the antenna structure to selectively connect either dipole to the transmission line, and to maintain connection with the selected dipole over a predetermined angle of antenna rotation.

The upper housing 14 is adapted to rotate on the bearing surface 20 which is seated upon the rim of the lower housing 15. Vertical displacement of the rotatable structure is prevented by means of set screw 22 which is threaded in the side wall of upper housing 14 in slidable engagement with the race 23 which is formed on the periphery of lower housing 15.

Figure 5:
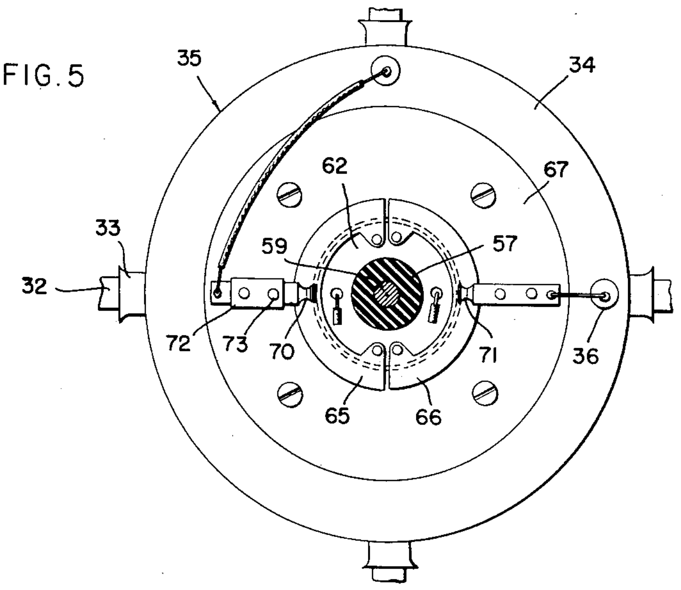
Fig. 5 is a bottom view of the antenna switching unit (taken on lines 5—5 of Fig. 4)

The rotatable upper housing 14 is provided with horizontally extending sleeves, such as sleeve 28, for supporting the dipole elements 9 and 11. The dipole elements are fitted with insulating bushings 29 which are fixed thereto by means of set screws 30. The bushing 29 and the dipole elements are seated within the supporting sleeve 28 and secured by means of set screws 31. Connecting pins 32 are arranged in the ends of the dipole elements 9 and 11 and are adapted to frictionally engage with clamping contacts 33. Referring to Fig. 5 it may be seen that these clamping contacts are arranged at 90 degree intervals around the periphery of the non-conductive housing 34 of a rotary antenna switch 35. Clamping screws 36 and 37 are mounted in the non-conductive housing 34 so as to provide an electrical contact with the clamping contacts 33. Conductor leads 38 are extended between the clamping screws 36 and 37 and an associated terminal clip of the rotary antenna switch 35 which is subsequently to be described.

Antenna switch 35 is provided within the upper housing 14 for coupling a receiver with the dipoles. The housing 34 of the rotary switch 35 and its associated connectors are fixed relative to housing 14 to rotate therewith whereas the lower section of switch 35 is rigidly affixed, in the manner of a stator, relative to the stationary lower housing 15. The operation and details of the rotary antenna switch 35 will hereinafter be more completely described with reference to Figs. 4 and 5.

The upper housing 14 may be rotated by a reversible electric motor 41 through suitable reduction gears (not shown) within box 40 which is fastened to the supporting shoulder 42 contained within the lower housing 15. The motor 41 drives the pinion gear 43 which meshes with and imparts rotative movement to the driving gear 44. The driving gear 44 is mounted upon the upper portion 45 of box 40 and is arranged to mesh with the annular gear 25. Rotary motion of driving gear 44 will cause the annular gear 25 and therewith the entire upper housing 14, with which it is operably associated, to rotate in one direction or the other. Accordingly, the upper housing 14 will rotate with respect to the stationary lower housing 15 in a direction dependent upon the direction of rotation of the motor 41.

Insulated terminal board 50 is affixed to the side wall of box 40 and connecting lugs, such as lug 51, are attached thereto so as to provide a terminating and distributing point for the motor control conductors 17 and the motor leads 52. The antenna transmission line 53 is connected to lugs 55 and 56 which are mounted on the insulated stator shaft 57 of rotary antenna switch 35.

Figure 6:
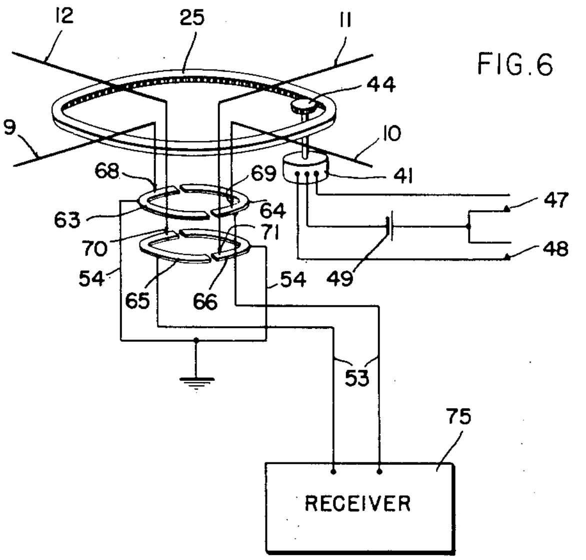
Fig. 6 is a diagram of the antenna switching circuit and the motor control circuit.

Referring to Fig. 6 there is illustrated by diagram a controlling circuit for selectively energizing and reversing the electric motor 41. Switches 47 and 48 are arranged to separately apply potential from a suitable source such as the local battery 49 to the motor 41. The closure of switch 47 will energize the motor 41 causing rotation in one direction whereas rotation in the opposite direction will be effected by the closure of switch 48.

Figure 4:
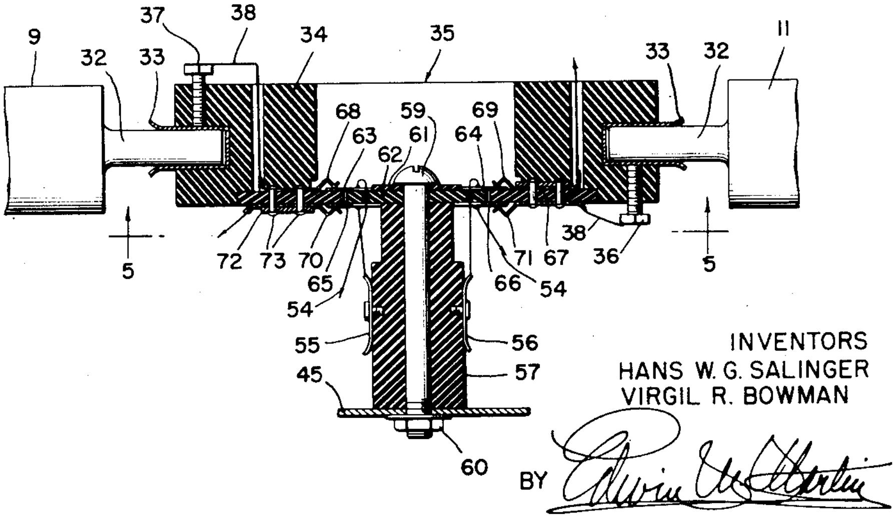
Fig. 4 is an enlarged cross sectional view of the antenna switching means.

Referring now to Figs. 4 and 5, there is illustrated an enlarged sectional view and bottom view respectively, of the rotary antenna switch 35. Fig. 5 is a view taken on the line 5—5 of Fig. 4. A non-conductive housing 34 is arranged to rotate with respect to the switch stator 57 which is rigidly affixed to the upper portion 45 of box 40 by means of bolt 59 and nut 60. Directly beneath the head of bolt 59 is a segment switch arrangement which is frictionally held by bolt 59 against the top surface of stator 57. The segment switch arrangement comprises insulating washer 61 and insulator segment holder 62 to which are attached metallic segments 63, 64, 65 and 66 (Fig. 6). The segments 63 and 64 are mounted on the top surface of the insulator segment holder 62 whereas the segments 65 and 66 are located on the underside thereof, there being no electrical connection between the individual conductive segments.

Referring to Fig. 5, it may be seen that segments 65 and 66 are each of semicircular form and are mounted upon the lower surface of insulator segment holder 62 in such a manner as to present a circularly shaped flat conductive surface which is divided into two equal sections electrically separated from one another. The segments 63 and 64 are similarly mounted upon the upper side of holder 62 to form a similar flat conductive surface. The dipole elements are connected with the individual segments by means of terminal clips 68, 69, 70 and 71 (Figs. 4, 5 and 6), which are affixed to the rotatable clip holder 67 which in turn is fixed to insulator housing 34.

The terminal clips are each arranged upon the clip holder 67 so as to conductively engage with the surfaces of the separate segments 63, 64, 65, 66 on segment holder 62. The clip holder 67 and its associated terminal clips are adapted to rotate with the upper housing 14, thereby allowing each terminal clip successively to contact two segments during a complete rotative cycle. The terminal clips 68 and 70 are displaced with respect to the terminal clips 69 and 71, whereby at any given instant, only one terminal clip will be in contact with each segment as illustrated in Figs. 4, 5 and 6. It will be noted that terminal clips 68 and 70 are fastened to the clip holder 67 by means of insulator plate 72 and rivets 73. Insulator plate 72 provides means for electrically isolating the terminal clip 70 from terminal clip 68. The same arrangement is provided with respect to terminal clips 69 and 71 wherein insulator plate 74 electrically isolates the two terminal clips from each other.

There is provided by this rotary switching arrangement, means whereby dipole elements 9, 10, 11 and 12 may be connected to movable terminal clips 68, 69, 71 and 70 respectively, each clip making separate electrical contact with a fixed segment. The segments are selectively paired, or matched, whereby one complete dipole or the other may be simultaneously connected to a certain matched pair of segments which are arranged to connect the dipole to the transmission line or to render the dipole inactive. The opposite condition, or reverse connections may be effected by rotative movement of the upper housing 14 which will cause, in due time, the rotary switch to assume the alternative position.

Fig. 6 is a diagrammatic illustration of the rotating and switching apparatus described in the present invention and the same numerals of reference are employed to designate the apparatus described previously in Figs. 1 to 5, inclusive.

The rotating elements contained herein comprise the annular gear 25 to which is rigidly fixed the dipole elements 9, 10, 11 and 12, dipole elements 9 and 11 forming a first resonant antenna whereas the dipole elements 10 and 12 constitute a distinctly separate antenna. The dipole antennas are 90 degrees displaced with respect to one another and each dipole element will be operably associated with a separate segment. The adjacent ends of dipole elements 9 and 11 are connected to the terminal clips 68 and 71 which are illustrated in engagement with the stationary segments 63 and 66 respectively. Dipole elements 10 and 12 are connected to the terminal clips 69 and 70 and are illustrated in contact with the segments 64 and 65, respectively.

It will be apparent that the energization of electric motor 41, by the actuation of switches 47 or 48, will cause the driving gear 44 to rotate in one direction or another. Driving gear 44 is meshed with the annular gear 25 so that rotative movement will cause the gear 25 and the associated dipole elements to revolve. At the same time, the terminal clips 68 to 71, inclusive, will likewise rotate upon the segments in unison with the rotative movement of the dipoles.

Stationary segments 64 and 65 are conductively coupled to the remotely located receiver 75 by means of transmission line 53. In the present illustration, segments 64 and 65 are arranged in contact with the terminal clips 69 and 70, respectively. These terminal clips connect with the dipole elements 10 and 12 enabling signal energy which impinges on the dipole to be conductively transferred to the receiver 75. Under these conditions, it will be noted that dipole 9 and 11 is deactivated by reason of the dipole elements being conductively connected through the terminal clips 68 and 71, to the grounded segments 63 and 66, respectively.

It is to be noted that segments 63 and 66 are permanently grounded through conductors 54 whereas segments 64 and 65 are at all times connected to the transmission line 53 which is coupled to the receiver 75. Therefore, continued rotative movement of the dipoles will eventually cause a reversal of the connections shown. In the reversed condition the dipole 10 and 12 would be disconnected from the receiver circuit and shunted to ground, whereas dipole 9 and 11 would be coupled to the receiving circuit.

There is provided by means of segments 64 and 65 an electrical connection with receiver 75 extending through 360 degrees of rotation. Dipole 9 and 11 is actively associated with receiver 75 for only 180 degrees of a rotary cycle, whereas dipole 10 and 12 is connected with the receiver during the remaining 180 degrees of the rotary cycle. During the time that one dipole is activated, the other dipole is deactivated and remains inactive during orientation due to being in contact with the grounded segments 63 and 66. The active dipole will remain associated with receiver 75 during the entire 180 degrees of rotary movement. The different dipoles may be switched to the receiver 75 by permitting the rotative apparatus to operate for the period of time required to enter the desired 180 degree phase of the rotative cycle.

Therefore, the present invention overcomes the shortcomings of the prior art type television antenna by reason of being a remotely controlled rotatable antenna structure which may be angularly adjusted to all compass directions in which maximum reception may take place. In this manner the sensitivity properties and the discriminative qualities of a directional antenna may be employed to full advantage.

The controlled orientation of the antenna aids in the elimination of reflected signals, ghost images, and generally improves television reception by enabling the television listener to instantaneously adjust the directional setting of the antenna while observing the results upon the television viewing screen.

There is also provided in accordance with this invention a novel unitary structure comprising a pair of dipoles, each of which may be resonant to widely separate frequency bands. Selection of one dipole or the other is accomplished by the same rotary movement which is employed for antenna orientation. A switching arrangement associated with the rotary apparatus permits the use of a single transmission line between the antenna elements and the receiver, thereby dispensing with the necessity for having individual feeder lines for each dipole.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination, an antenna structure for receiving radiant energy in two separate wave bands comprising a first directional antenna tuned to a relatively high frequency band, and a second directional antenna displaced 90 degrees with respect to said first antenna and tuned to a relatively low frequency band, means for rotatably supporting said antennas, rotatable switch means operably associated with said supporting means and comprising a first pair of contacts connected to said first antenna to rotate therewith, a second pair of contacts connected to said second antenna to rotate therewith and stationary contact means associated with said first and second pair of contacts whereby to establish a circuit to one antenna during the first 180 degrees of rotation of said structure and to the other antenna during the second 180 degrees of rotation of said structure.

2. In combination, an antenna structure for receiving radiant energy in two separate wave bands comprising a first dipole tuned to a relatively high frequency band, and a second dipole displaced 90 degrees with respect to said first dipole and tuned to a relatively low frequency band, means for rotatably supporting said dipoles and rotatable switch means operably associated with said supporting means and comprising a first pair of contacts connected to said first dipole, a second pair of contacts connected to said second dipole and stationary signal conductors operably associated with said contacts for establishing a circuit to one of said dipoles during the first 180 degrees of rotation of said structure and to the other of said dipoles during the second 180 degrees of rotation of said structure.

3. In combination, an antenna structure for receiving radiant energy in two separate wave bands comprising a first directional antenna tuned to a relatively high frequency band, and a second directional antenna displaced 90 degrees with respect to said first antenna and tuned to a relatively low frequency band, means for rotatably supporting said antennas, rotatable switch means operably associated with said supporting means and comprising a first pair of contacts connected to said first antenna to rotate therewith, a second pair of contacts connected to said second antenna to rotate therewith, first and second pairs of stationary contact segments associated with said first and second pairs of contacts, a ground connection to one pair of said segments and a transmission conductor connected to the other pair of segments.

4. In combination, an antenna structure for receiving radiant energy in two separate wave bands comprising a first directional antenna tuned to a relatively high frequency band, and a second directional antenna displaced 90 degrees with respect to said first antenna and tuned to a relatively low frequency band, means for rotatably supporting said antennas, rotatable switch means operably associated with said supporting means and comprising a first pair of contacts connected to said first antenna to rotate therewith, a second pair of contacts connected to said second antenna to rotate therewith, a first stationary contact segment associated with one contact of each of said first and second pairs of contacts, a transmission conductor connected to said first stationary contact segment and a second stationary contact segement associated with the other contact of each of said first and second pairs of contacts and another transmission conductor connected to said second segment whereby to establish a circuit to one of said antennas during the first 180 degrees of rotation of said structure and to the other of said antennas during the second 180 degrees of rotation of said structure.

5. In combination, an antenna structure for receiving radiant energy in two separate wave bands comprising a first directional antenna tuned to a relatively high frequency band, and a second directional antenna displaced 90 degrees with respect to said first antenna and tuned to a relatively low frequency band, means for rotatably supporting said antennas, rotatable switch means operably associated with said supporting means and comprising a first pair of contacts connected to said first antenna to rotate therewith, a second pair of contacts connected to said second antenna to rotate therewith, a first pair of stationary contact segments displaced 180 degrees with respect to one another and associated with one contact of each of said first and second pairs of contacts, a ground connection to one of said segments, a transmission conductor connected to the other of said segments, a second pair of stationary contact segments displaced 180 degrees with respect to one another and with respect to said first pair of segments and associated with the other contact of each of said first and second pairs of contacts, a ground connection to one of said second pair of segments, and a transmission conductor connected to the other of said second pair of segments whereby to establish a circuit to one of said antennas during the first 180 degrees of rotation of said structure and to the other of said antennas during the second 180 degrees of rotation of said structure.

6. In combination, an antenna structure for receiving radiant energy in two separate wave bands comprising a first dipole tuned to a relatively high frequency band, and a second dipole displaced 90 degrees with respect to said first dipole and tuned to a relatively low frequency band, means for rotatably supporting said dipoles, switch means operably associated with said supporting means and comprising a first pair of contacts connected to said first dipole to rotate therewith, a second pair of contacts connected to said second dipole to rotate therewith, a first pair of stationary contact segments displaced 180 degrees with respect to one another and associated with one contact of each of said first and second pairs of contacts, a ground connection to one of said segments, a transmission conductor connected to the other of said segments, a second pair of stationary contact segments displaced 180 degrees with respect to one another and with respect to said first pair of segments and associated with the other contact of each of said first and second pairs of contacts, a ground connection to one of said second pair of segments, and a transmission conductor connected to the other of said second pair of segments whereby to establish a circuit to one of said dipoles during the first 180 degrees of rotation of said structure and to the other of said dipoles during the second 180 degrees of rotation of said structure.

7. In combination, an antenna structure for receiving radiant energy in two separate wave bands comprising a first directional antenna tuned to a relatively high frequency band, and a second directional antenna displaced 90 degrees with respect to said first antenna and tuned to a relatively low frequency band, a stationary supporting structure, a rotatable housing operatively associated with said stationary structure for supporting said antennas, and switch means operably associated with said rotatable housing and comprising a first pair of contacts connected to said first antenna to rotate therewith, a second pair of contacts connected to said second antenna to rotate therewith, and stationary contact segments fixed to said stationary supporting structure in electrical contact with said first and second pairs of contacts for establishing a circuit to one of said antennas during each 180 degrees of rotation of said rotatable housing.

HANS W. G. SALINGER.
VIRGIL R. BOWMAN.

REFERENCES CITED

The following references are of record in the file of this patent:

UNITED STATES PATENTS

| Number | Name | Date |
|---|---|---|
| 1,842,342 | Eaton | Jan. 19, 1932 |
| 2,268,640 | Brown | Jan. 6, 1942 |
| 2,268,664 | Landon | Jan. 6, 1942 |
| 2,354,332 | Polydoroff | July 25, 1944 |
| 2,364,084 | Martin | Dec. 5, 1944 |
| 2,404,012 | Worrall | July 16, 1946 |

FOREIGN PATENTS

| Number | Country | Date |
|---|---|---|
| 501,439 | Great Britain | Feb. 24, 1939 |
| 545,880 | Great Britain | June 17, 1942 |